May 18, 1965  C. L. WHITEFORD  3,184,524
METHOD OF FORMING CONTAINERS
Filed Oct. 1, 1963  14 Sheets-Sheet 1
FIG. 1
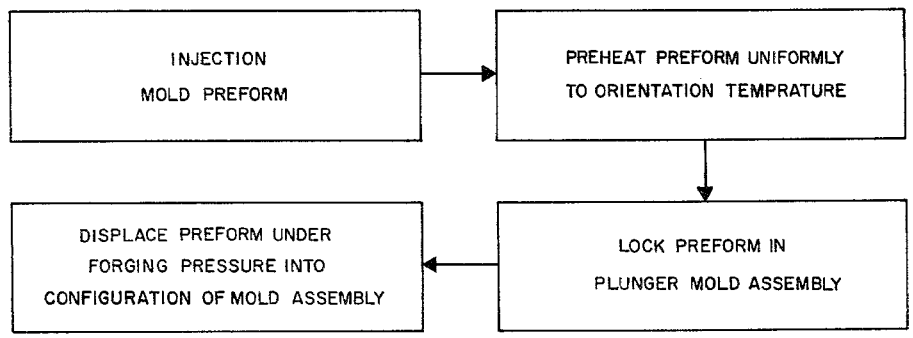
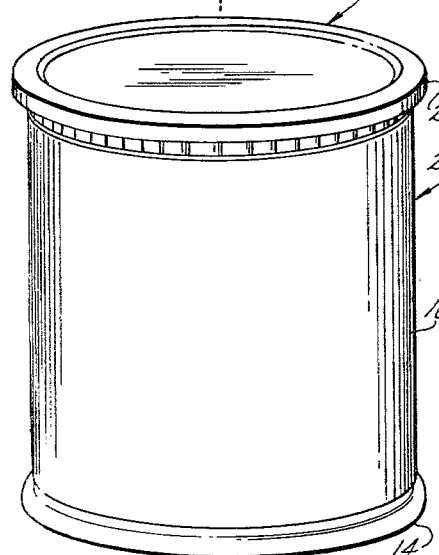
FIG. 2
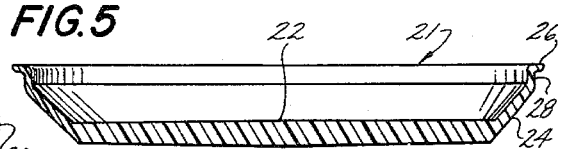
FIG. 5
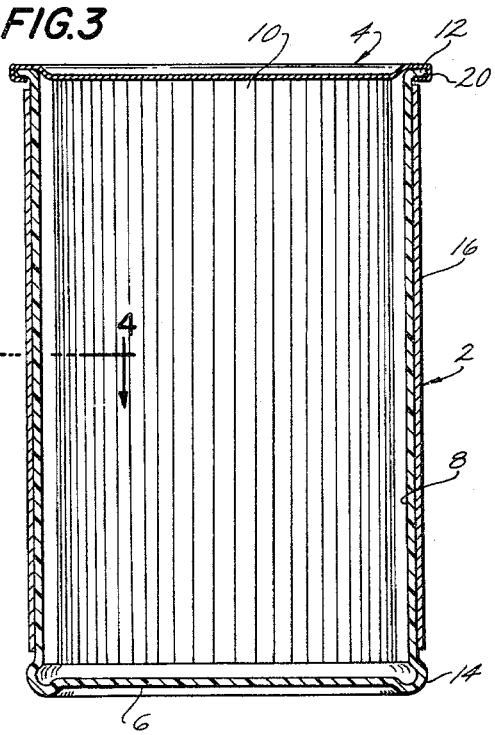
FIG. 3
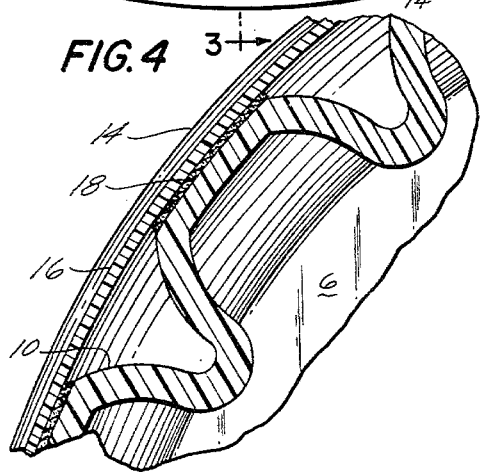
FIG. 4
INVENTOR.
CARLTON L. WHITEFORD
BY
*Peter L. Costas*
ATTORNEY

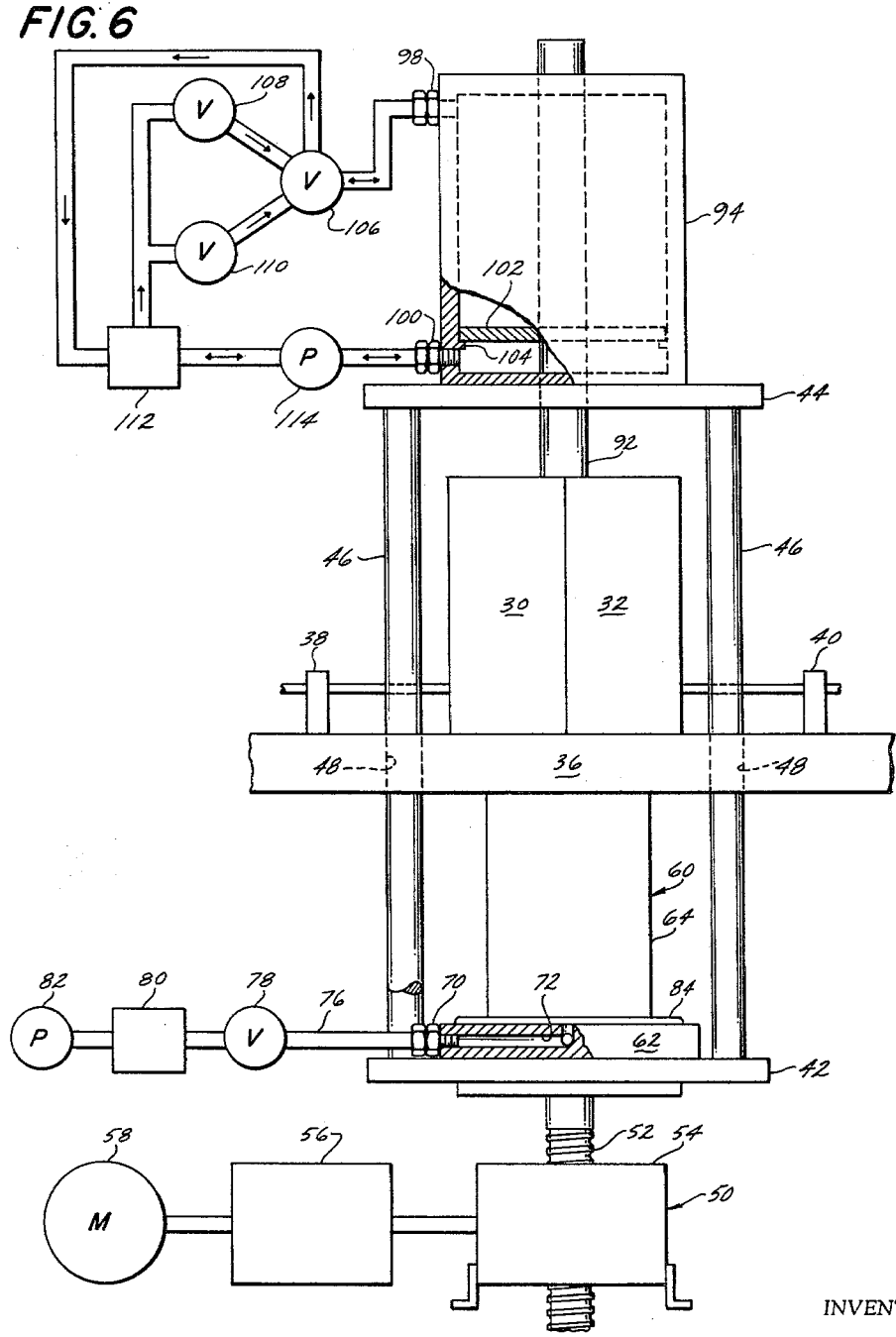

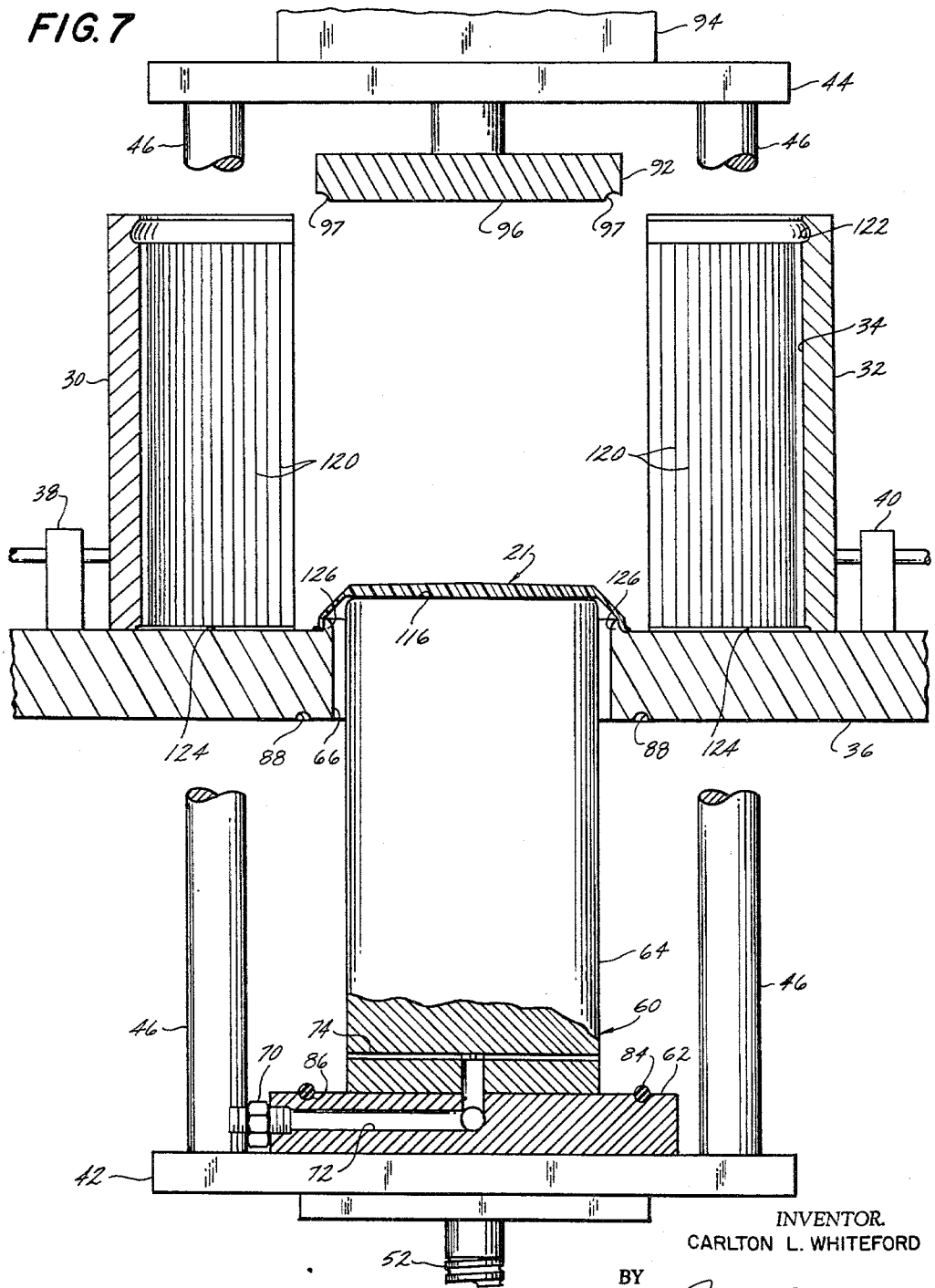

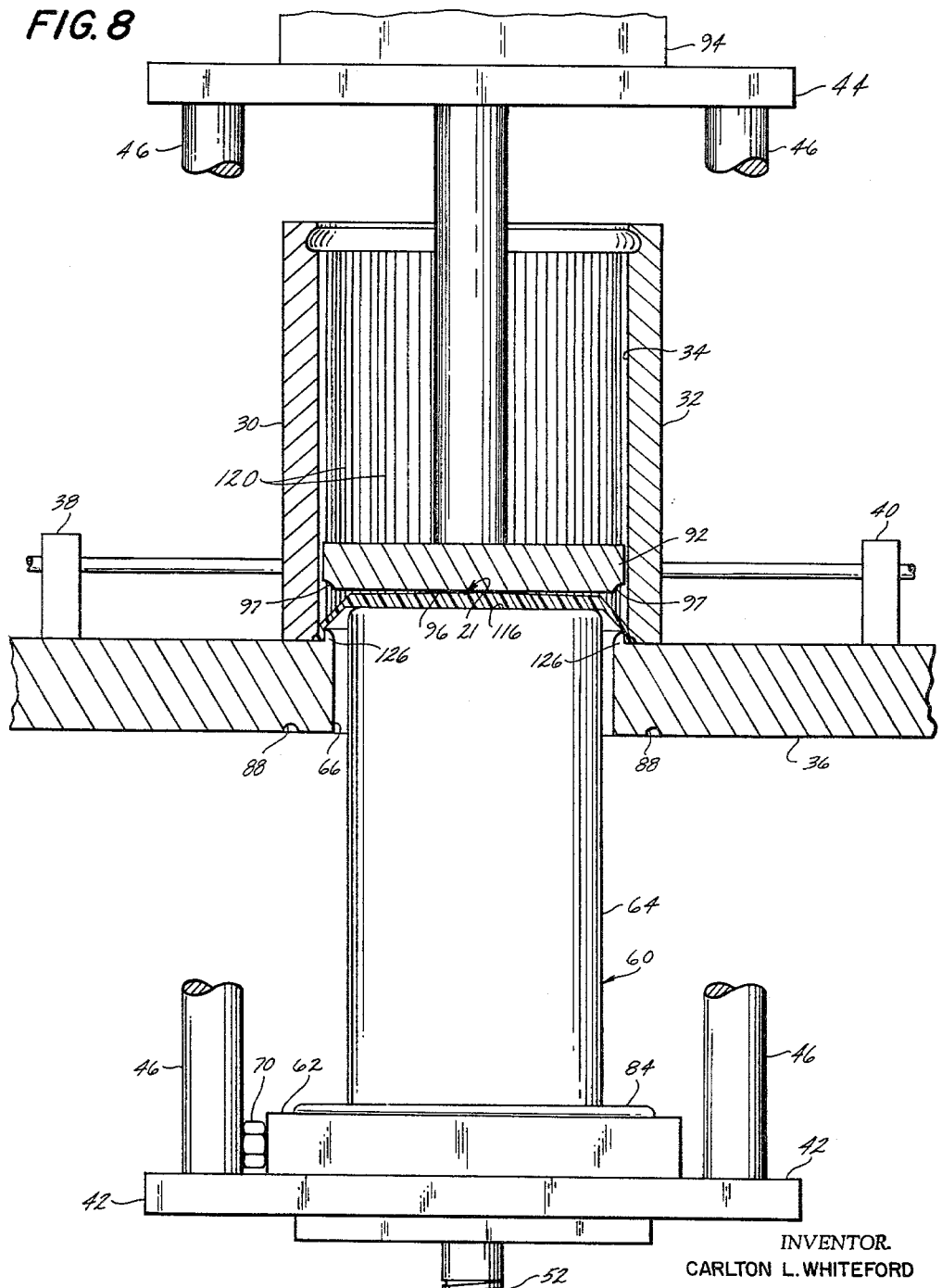

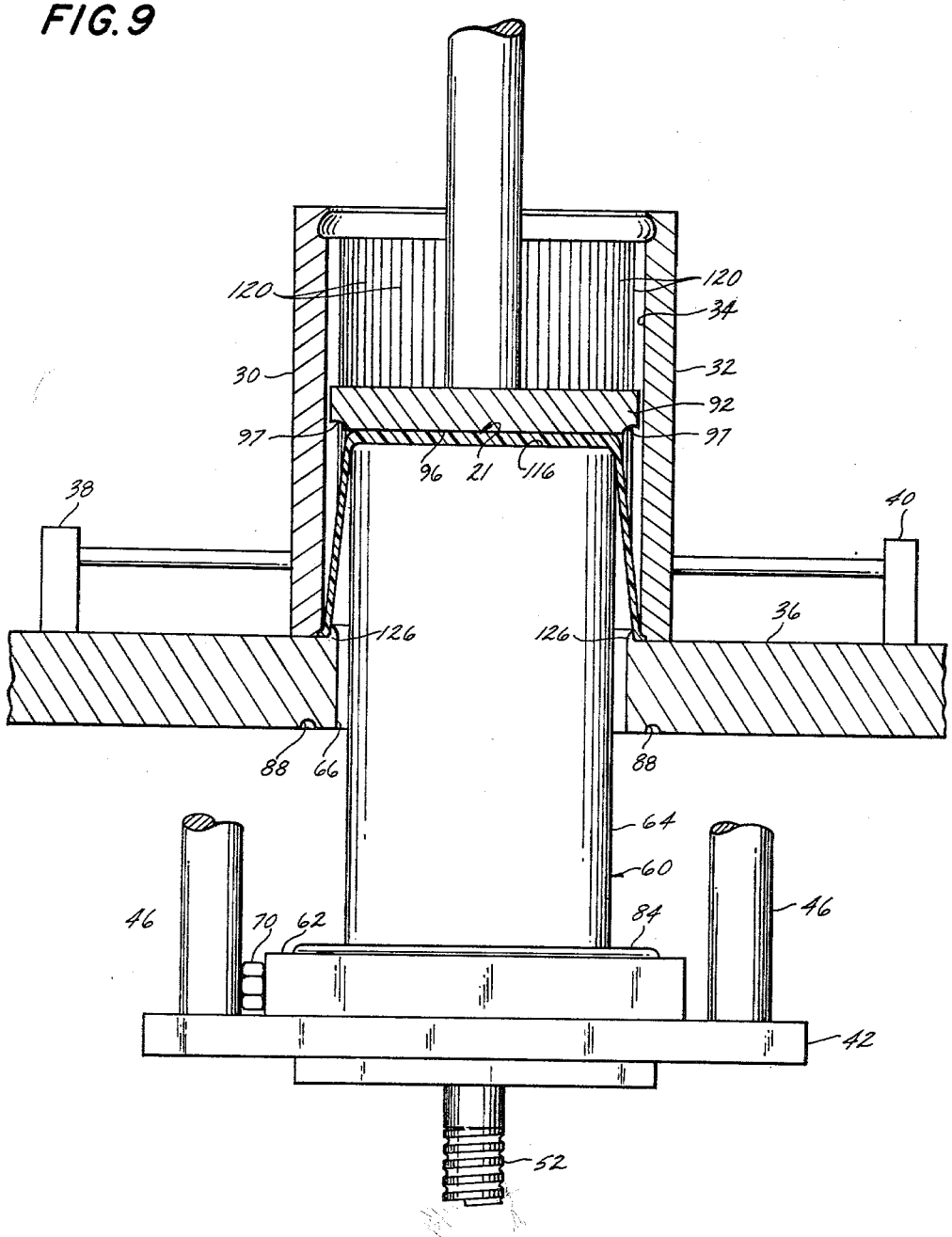

May 18, 1965   C. L. WHITEFORD   3,184,524
METHOD OF FORMING CONTAINERS
Filed Oct. 1, 1963   14 Sheets-Sheet 6

INVENTOR.
CARLTON L. WHITEFORD
BY
ATTORNEY

May 18, 1965 C. L. WHITEFORD 3,184,524
METHOD OF FORMING CONTAINERS
Filed Oct. 1, 1963 14 Sheets-Sheet 7

INVENTOR.
CARLTON L. WHITEFORD
BY
ATTORNEY

May 18, 1965   C. L. WHITEFORD   3,184,524
METHOD OF FORMING CONTAINERS
Filed Oct. 1, 1963   14 Sheets-Sheet 8

INVENTOR.
CARLTON L. WHITEFORD
BY
ATTORNEY

May 18, 1965 C. L. WHITEFORD 3,184,524
METHOD OF FORMING CONTAINERS
Filed Oct. 1, 1963 14 Sheets-Sheet 11
FIG.16
FIG.17
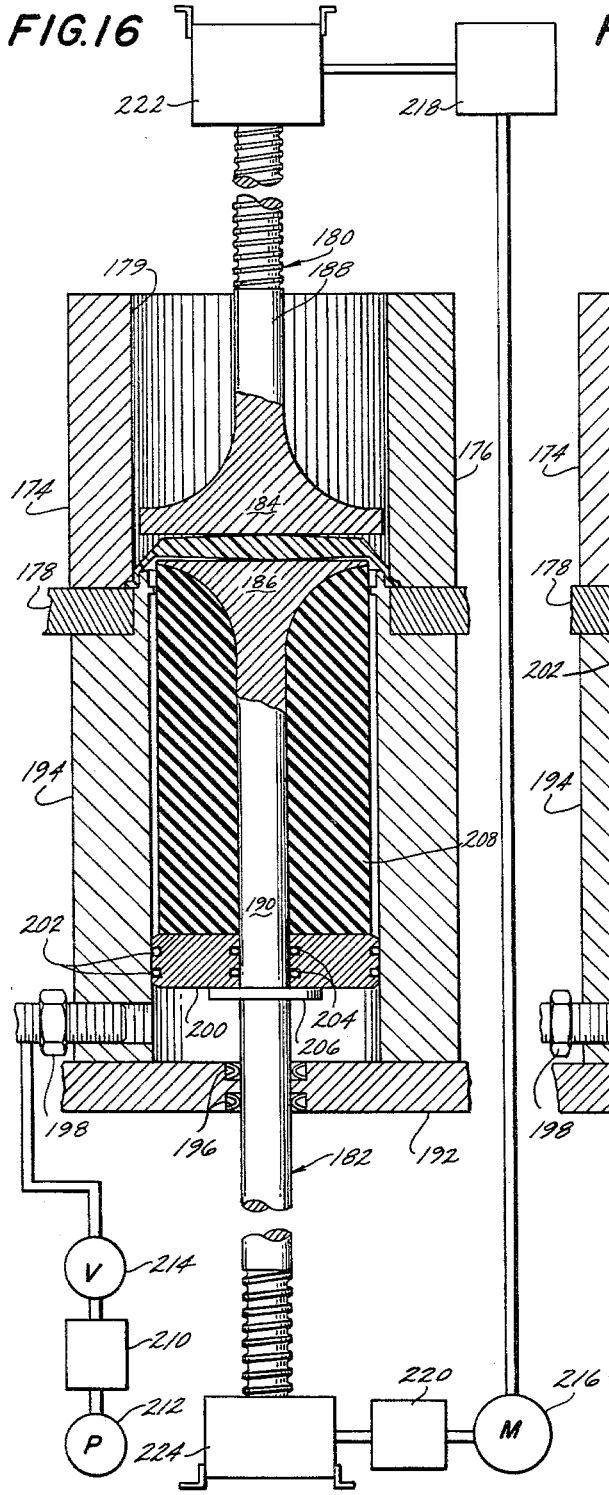
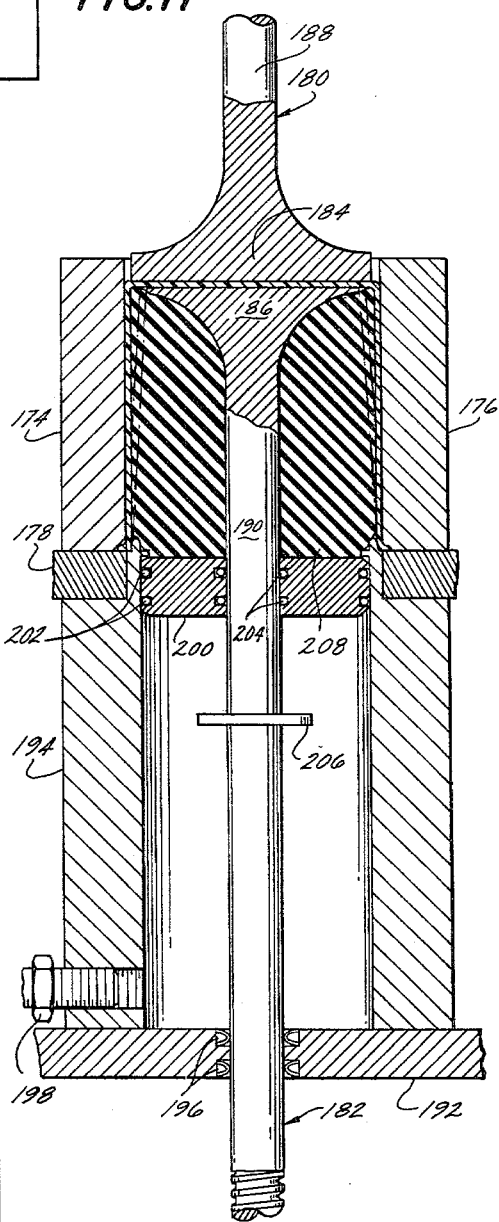
INVENTOR.
CARLTON L. WHITEFORD
BY
ATTORNEY May 18, 1965 C. L. WHITEFORD 3,184,524
METHOD OF FORMING CONTAINERS
Filed Oct. 1, 1963 14 Sheets-Sheet 12

INVENTOR.
CARLTON L. WHITEFORD
BY
ATTORNEY

May 18, 1965  C. L. WHITEFORD  3,184,524
METHOD OF FORMING CONTAINERS
Filed Oct. 1, 1963  14 Sheets-Sheet 13
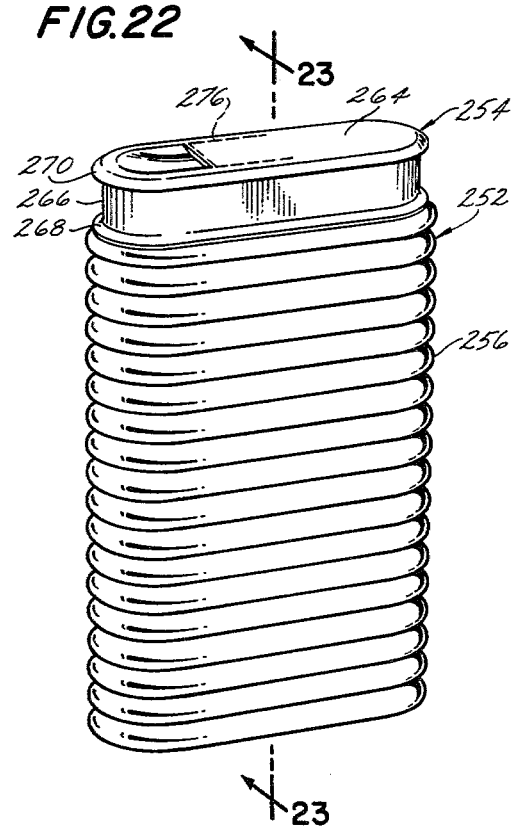
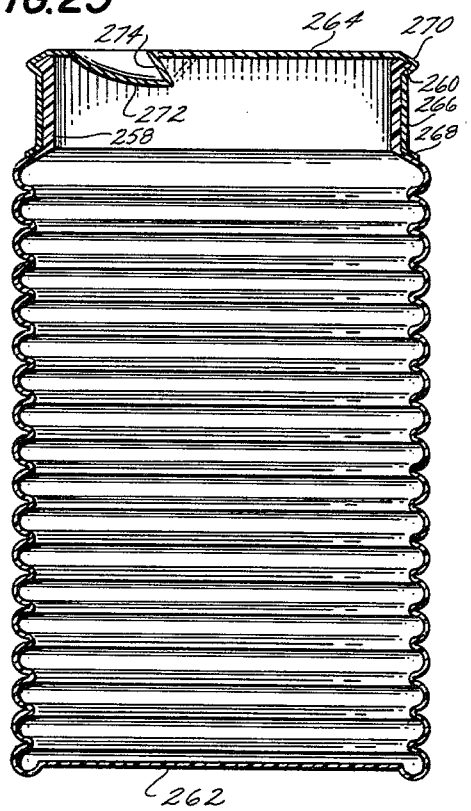
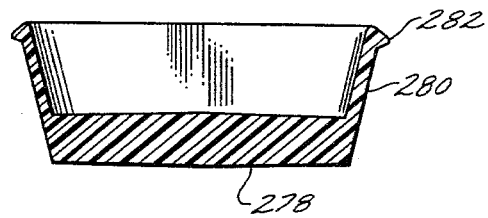
INVENTOR.
CARLTON L. WHITEFORD
BY
ATTORNEY May 18, 1965  C. L. WHITEFORD  3,184,524
METHOD OF FORMING CONTAINERS
Filed Oct. 1, 1963  14 Sheets-Sheet 14
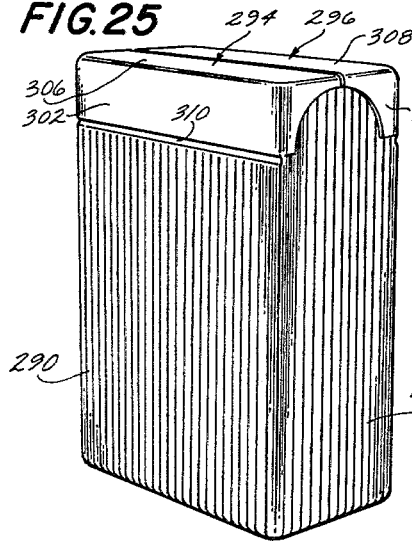
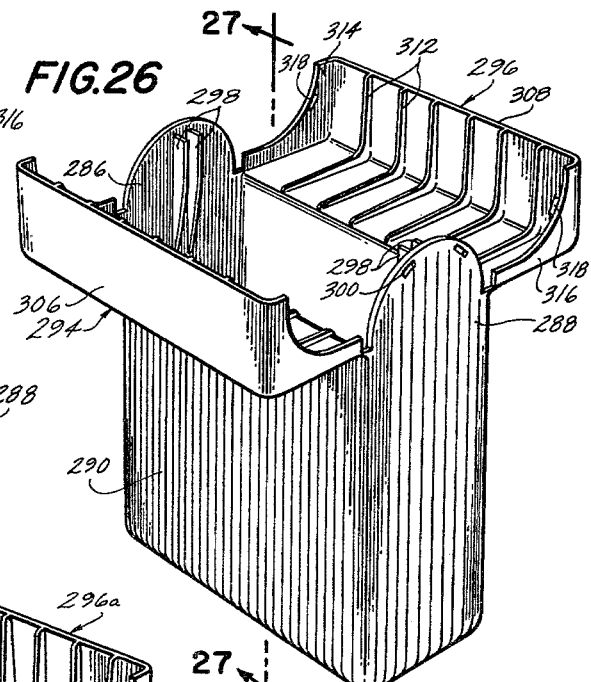
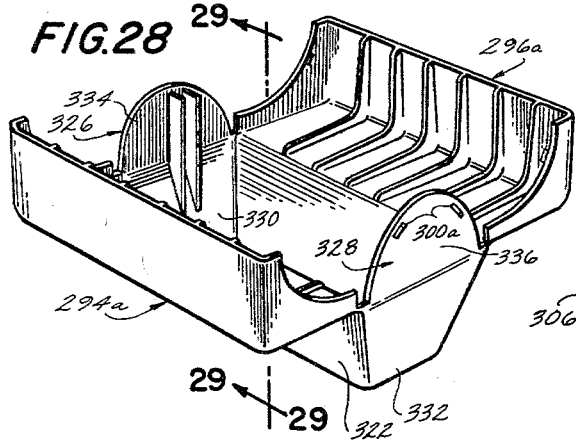
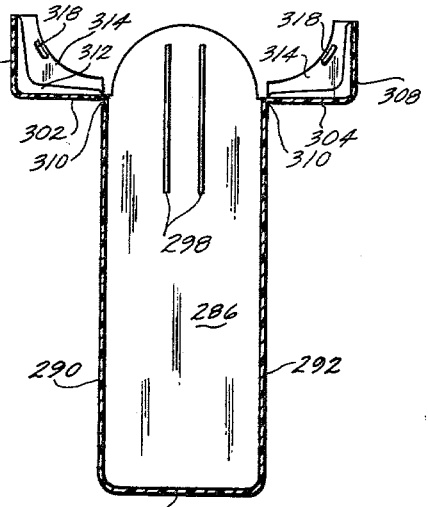
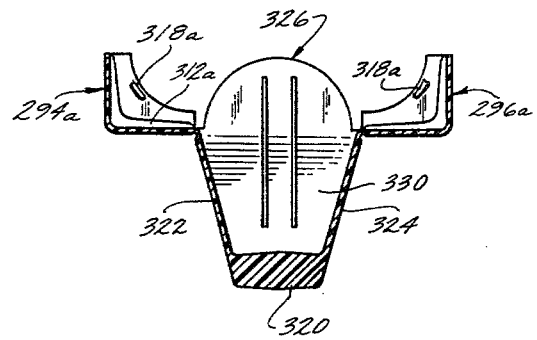
INVENTOR.
CARLTON L. WHITEFORD
BY
ATTORNEY

United States Patent Office 3,184,524
Patented May 18, 1965

3,184,524
METHOD OF FORMING CONTAINERS
Carlton L. Whiteford, New Canaan, Conn., assignor to Poly-Pak Corporation of America, Springdale, Conn., a corporation of Delaware
Filed Oct. 1, 1963, Ser. No. 313,071
15 Claims. (Cl. 264—94)

The present invention relates to synthetic plastic articles, and, more particularly, to the method of forming containers and other hollow articles which have walls of substantially multiaxially oriented synthetic plastic.

Heretofore, it has been well known that great strength in relatively thin section can be obtained by use of biaxially oriented synthetic plastic material, thus making possible economical, relatively high-strength containers of synthetic plastic material. Generally, this has resulted in widespread use of biaxially oriented sheet material for thermoforming into various configurations. Such thermoforming occasionally may be disadvantageous in that the sheet material may be drawn non-uniformly so that variable or very thin-wall sections may occur with resultant weak points in the thermoformed structure.

Moreover, in effecting a deep draw of the plastic sheet conventionally used for thermoforming, the problem of non-uniform wall section is aggravated and thick sheeting must generally be used to provide sufficient wall thickness in the drawn portion. Plug or other mechanical assist techniques are oftentimes employed to alleviate these difficulties in thermoforming, but generally blow-molding techniques using an elongate parison have been primarily employed for forming containers and other hollow articles having a relatively deep body or cavity. Generally, such blow-molded articles do not possess high molecular orientation for optimum strength and utilization of materials.

It is an object of the present invention to provide a novel method for forming containers and other hollow articles of synthetic plastic material wherein the molecules in the wall portions are substantially highly multiaxilly oriented.

Another object is to provide such a method of producing substantially multiaxially oriented articles wherein the wall thickness of the articles may be closely controlled to achieve high strength and optimum utilization of material for most economical practice.

Other objects and advantages will be apparent from the following detailed description and claims and the attached drawings wherein:

FIGURE 1 is a flow sheet of a process embodying the present invention;

FIGURE 2 is a perspective view of a continer produced in accordance with the present invention;

FIGURE 3 is a sectional view of the container along the line 3—3 of FIGURE 2;

FIGURE 4 is a fragmentary sectional view to an enlarged scale along the line 4—4 of FIGURE 3;

FIGURE 5 is a side elevational sectional view of an injection-molded preform used for fabricating the body portion of the containers of FIGURES 2-4;

FIGURE 6 is a diagrammatic illustration of one embodiment of apparatus for conducting the present invention;

FIGURE 7 is a fragmentary side elevational section of the die and pressure-forming portion of the apparatus of FIGURE 6 at the loading step of the pressure-forming cycle;

FIGURE 8 is a similar sectional view after the split mold components and top plunger have clamped the preform in position;

FIGURE 9 is a similar sectional view during the displacement of the center of the preform inwardly of the mold cavity;

FIGURE 16 is a fragmentary sectional view diagrammatically illustrating still another embodiment of apparatus for performing the method of the present invention at the commencement of the pressure-forming cycle;

FIGURE 17 is a similar view of the embodiment at the end of the pressure-forming cycle and showing in phantom line the displaced preform prior to final deformation;

FIGURE 22 is a perspective view of another embodiment of a container produced in accordance with the present invention, more particularly, a dispenser container adapted to the dispensing of granular or other solids such as soaps and detergents;

FIGURE 23 is a sectional view to an enlarged scale along the line 22—22 of FIGURE 22;

FIGURE 24 is an elevational view in section of an injection-molded preform for pressure-forming into the body of the container of FIGURES 22 and 23;

FIGURE 25 is a perspective view of another embodiment of container produced in accordance with the present invention, more particularly, a cigarette or like container;

FIGURE 26 is a similar view of the container of FIGURE 25 with the top closure elements thereof in opened position;

FIGURE 27 is a sectional view along the line 27—27 of FIGURE 26;

FIGURE 28 is a perspective view of an injection-molded preform for pressure forming into the container of FIGURES 25-27; and FIGURE 29 is a sectional view of the preform along the line 29—29 of FIGURE 28.

Figure 10:
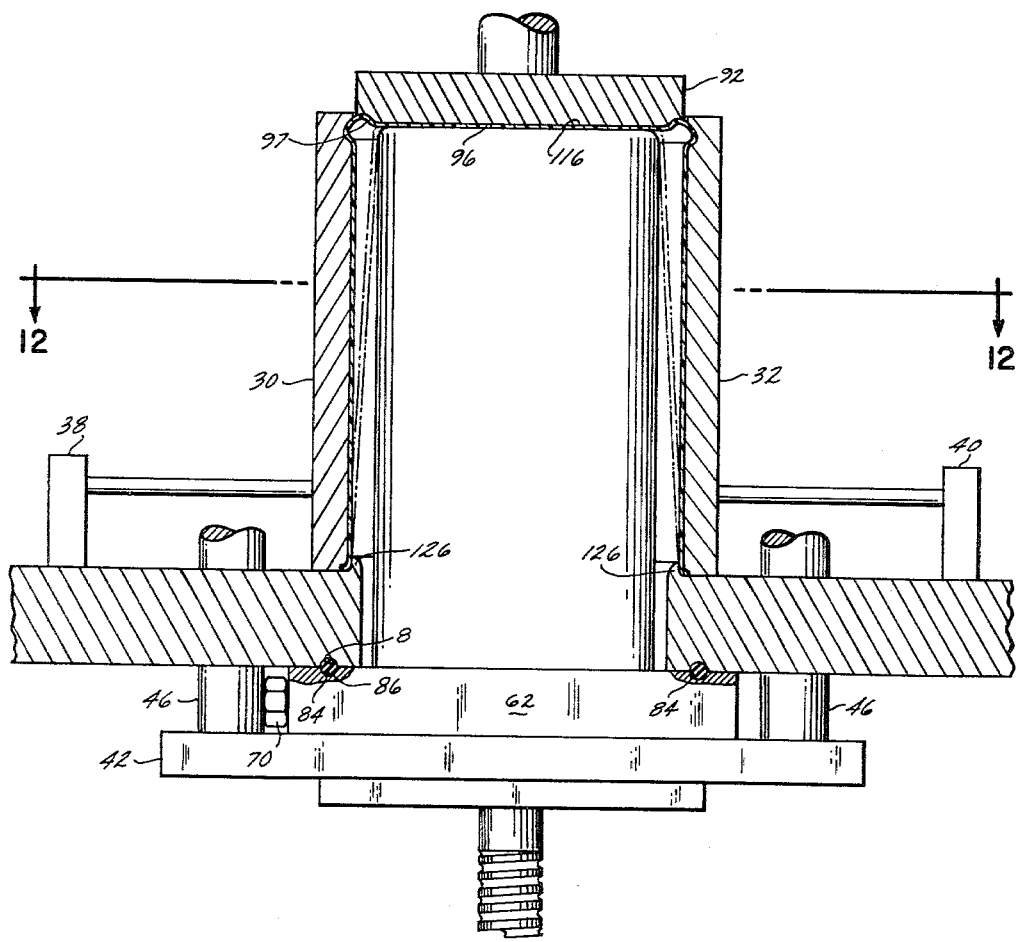
FIGURE 10 is a similar sectional view showing in phantom line the preform when the center portion has been fully displaced inwardly of the mold cavity and showing in solid line the preform as finally molded into conformity with the walls of the mold assembly.

It has now been found that the foregoing and related objects can be readily attained by a method in which a preform of orientable synthetic plastic material is molded into predetermined configuration and then clamped about its periphery adjacent one end of a mold cavity of the desired wall configuration. The center portion of the preform is then displaced inwardly of the mold cavity relative to the clamped periphery thereof while compressive pressure is simultaneously applied to both surfaces of the center portion to effect lateral flow of the synthetic plastic material in the center portion and provide synthetic plastic material in the wall portion being formed between the clamped periphery and the displacing center portion. After the center portion has been displaced fully inwardly of the mold cavity, pressure is applied to the interior of the displaced preform to expand or stretch it into conformity with the wall of the mold cavity to form a hollow article of the desired configuration. The displacement and pressure application are conducted below the molten temperatures of the synthetic plastic material and at orientation temperatures thereof to effect molecular orientation during the inward displacement, lateral flow and expansion of the preform material.

The hollow articles produced by the present invention have substantially radial orientation of the molecules in the bottom wall portion produced by the compressive deformation and stretching during final conformation. The side wall portion has substantially multiaxial orientation of the molecules due to the radial orientation produced in the material compressively expressed laterally for formation of the lower section of the side wall portion with substantial vertical or axial orientation due to the axial displacement and stretching of the side wall portion and substantial transverse or peripheral orientation due to the stretching during final conformation. Thus, the molecules of the synthetic plastic are substantially oriented along a plurality of axes, herein referred to as multiaxial orientation or multiaxially oriented.

The hollow articles of the present invention are desirably employed as disposable containers because of their high strength and relatively low cost. The closure for the opening of the container may be molded as a part of the preform, or a separate closure of metal, plastic or other material may be employed. To enhance further the strength of the hollow article, it may be provided with a peripheral reinforcing band of material, desirably uniaxially oriented synthetic plastic which has been oriented in the peripheral direction.

Since it is quite important that the material of the preform be stretched uniformly and also that the method be conducted as rapidly as possible for optimum economy, the preform preferably is soaked to a uniform temperature throughout its thickness prior to introduction into the mold cavity, conveniently by hot air, oil or other suitable means for a sufficient period of time. Conveniently, this soaking may be carried out continuously on a conveyor or in a group or batch in a separate section of the apparatus, thus permitting preheating of the preforms before insertion into the mold cavity. To minimize any tendency for the clamped periphery to be stretched and thus disengaged under the considerable pressures employed, the clamping elements (or mold components) preferably are unheated or chilled so as to extract heat therefrom.

The temperatures employed should be below the molten temperature of the synthetic plastic material sufficiently so that there is no likelihood that incipient melting will occur during the pressure forming as a result of the energy introduced into the plastic material by reason of the extensive work being performed therein at substantial pressures. However, high orientation temperatures commensurate with the safety factor are desirable to reduce the pressures required for pressure deformation. For example, polypropylene has a melting temperature of about 330° Fahrenheit and is generally preheated to about 200 to 300° Fahrenheit, and preferably 250 to 290° Fahrenheit.

The displacement of the center portion of the preform and the compression thereof is effected by a pair of cooperating plunger or die means on opposite surfaces of the center portion which both move inwardly of the mold cavity to effect the desired displacement and one or both of which move towards the other during the displacing movement to effect the compressive pressure upon the preform material. The movement of the two plungers relative to each other should be closely controlled to obtain the desired rate of lateral flow or expression of the plastic material from between the plungers to form a relatively uniform thickness in the wall portion being formed as the center portion of the preform is being displaced inwardly. This synchronization and control of movement may be effected by gears, hydraulic control means, electrical circuitry, combinations thereof or other suitable control means, as will be apparent hereinafter. The pressures employed will vary upon the temperature of the plastic material at the time of deformation and compression, its resistance to deformation and the time period employed. For example, in forming a polypropylene preform which has been preheated to about 280° Fahrenheit, 5 to 20 tons pressure is satisfactorily employed to effect the inward displacement and 25 to 65 tons is satisfactorily employed to effect the compression and flow to elongate the preform about ten times in a period of about three seconds. To avoid premature chilling of the preform, at least the contacting faces of the plungers should be heated to the orientation temperature, conveniently by impulse heating elements on the face thereof, although conventional heating elements may be employed in the body thereof albeit with greater difficulty in effecting the desired chilling and setting of the plastic material upon completion of the forming cycle.

The plunger on the inside surface of the preform is of lesser width than the mold cavity so that the wall portion of the preform being formed during the inward displacement tapers inwardly from the clamped periphery and thus is spaced from the wall of the mold cavity. In this manner, friction is minimized and premature chilling and setting of the plastic material by contact with the mold wall is eliminated since the mold wall is desirably cooled to effect the desired chilling and setting upon final conformation of the plastic material.

The cooperating faces of the plungers and the wall of the mold cavity may be smooth or they may have various configurations to provide desired characteristics or appearance in the final article. For example, axial corrugations or ribs may be provided in the mold to provide vertical corrugations in the article for greater vertical strength in the final article, or peripheral corrugations or ribs may be provided in the mold wall to provide peripheral corrugations in the article for greater peripheral strength. The plunger die faces may be cooperatively configured to provide a ribbed concave bottom wall for a pressure container, or the outer plunger and mold wall may have cooperating peripheral recesses to provide a skirt or bead at the juncture of the side and bottom walls of the finished article.

The final deformation of the preform after the center portion has been fully displaced inwardly is effected by means which will effect substantially uniform pressure throughout the interior surface of the preform. Air or other fluid at relatively high pressures may be directly introduced into the preform to effect the final stretching and conformation, but concentrated impingement at any one point should be avoided. Oil or other fluid may be admitted to an expandible bladder or polyurethane or other heat-resistant and high-strength material maintained in a recess behind the plunger face to expand the bladder and press the preform into conformity with the mold cavity wall. As another alternative, a mass of resiliently deformable material which is heat resistant and relatively non-compressible may be maintained in a recess behind the plunger face and deformed by mechanical action to press the plastic material against the mold wall.

The preform has a configuration and dimensions predetermined to produce the desired wall thicknesses in the final article and permit the desired pressure deformation to obtain molecular orientation. Generally, the preform is dish-shaped with an outwardly extending peripheral flange for clamping in the mold and the sidewall portion thereof preferably is inclined inwardly to facilitate the formation of the inwardly tapering or inclined sidewall portion during displacement of the preform and the spacing of the sidewall portion of the preform from the wall of the mold cavity to avoid premature chilling and reduce friction. To facilitate further the formation of the desired uniformity of sidewall thickness, the sidewall portion of the preform preferably is of slightly greater thickness adjacent the center wall portion to compensate for the reduction in width of the wall portion due to the incline thereof which would reduce the volume thereof. To minimize the tendency for entrapment of air and to permit initial elongation of the sidewall portion of the preform prior to flow of the plastic material of the preform about the plunger and into the sidewall portion, the bottom wall portion of the preform is most desirably thicker at its center. The initial compression thereof will produce flow from the center outwardly to provide a time interval before plastic material flows about the side of the plunger, thus permitting the rate of movement of the two plungers relative to each other to be constant while effecting stretching of the material in the original sidewall portion of the preform.

Referring first to FIGURE 1 of the attached drawings, therein is a flow sheet diagrammatically illustrating the process of the present invention. Initially, a preform having a configuration predetermined to provide the desired wall sections in the finished article is prepared, preferably by injection molding. Next, the preform is heated uniformly throughout its entire thickness to a temperature below the molten temperature and at which molecular orientation of the particular synthetic resin may be effected. This uniform temperature desirably is effected by soaking for a sufficient period of time in air, oil or other suitable media to ensure uniformity, preferably in advance of placement within the mold assembly to minimize the time period required in processing a preform upon placement within the mold assembly. Alternatively, high frequency heating may be employed albeit with somewhat greater problems in ensuring control and the desired uniformity of temperature throughout.

After the preform has been heated to the orientation temperature, the periphery of the preform is locked at one end of the mold cavity of the stretching mold assembly between a pair of cooperating plungers, although this and the preceding step may be effected together as previously indicated. The center portion of the preheated preform then is displaced inwardly of the mold cavity at a substantially uniform rate while the cooperating plungers exert forging pressure upon the synthetic plastic material of the center portion to effect lateral flow of some of the synthetic plastic material into the side wall portion being formed by the inward displacement of the center portion. Lastly, the displaced preform is subjected to internal pressure sufficient to expand or stretch it into substantial conformity with the configuration of the mold assembly defined by the side walls of the mold cavity and the plunger faces. After this final displacement has been effected, the synthetic plastic material is allowed to set and cool, following which it is removed from the mold assembly.

Referring now to FIGURES 2–4 of the attached drawings, therein illustrated is one embodiment of a container formed in accordance with the present invention and having a hollow body member of synthetic plastic material generally designated by the numeral 2 and a metal cap or cover member generally designated by the numeral 4. The body member 2 is generally cylindrical and has a bottom wall portion 6 and a sidewall portion 8 having a multiplicity of vertically or axially extending ribs or corrugations 10 and an outwardly extending peripheral flange 12 at the upper end thereof. An outwardly and downwardly extending peripheral bead 14 is formed at the intersection of the bottom and sidewall portions 6, 8 and provides vertical spacing for the bottom wall portion from a supporting surface and a peripheral skirt cooperating with the flange 12.

To enhance the peripheral rigidity (hoop strength) and resistance to vertical loading, a label or band 16 of synthetic plastic sheet material extends about the periphery of the sidewall portion 8 and is bonded thereto by adhesive 18. In order to obtain optimum strength, the label 16 desirably is uniaxially oriented in the direction peripherally of the body element 2. In addition to providing reinforcement, the label permits facile preprinting and designing of the viewable sidewall of the container apart from the pressure-formed body portion. The label 16 is substantially protected from vertical shearing forces at the upper end by the flange portion 20 of the cap member 4 which is rolled about and engages the flange 12 on the sidewall portion 8 and at the lower end by the bead 14.

In accordance with the present invention, the sidewall portion 8 and bottom wall portion 6 together with the intermediate bead 14 are substantially multiaxially oriented during the forming operation so as to possess high strength in relatively thin section. This orientation is produced by the radial flow or "stretching" of the bottom wall portion at orientation temperature and the vertical stretching of the material as it forms the elongating sidewall portion followed by final peripheral or transverse stretching of the sidewall portion and further radial stretching of the bottom wall portion during final conformation of the displaced preform. The vertical corrugations 10 add strength in the axial or vertical direction and the uniaxially oriented label 16 greatly enhances the radial or peripheral strength of the body portion, thus enabling use of even thinner sections in a high-strength composite body member.

Referring now to FIGURE 5, therein illustrated is an injection-molded preform generally designated by the numeral 21 and of generally dish-shaped configuration. The preform 21 has a center or bottom wall portion 22, a sidewall portion 24 and a peripheral flange portion 26 extending radially outwardly at the top edge of the generally vertically extending section 28 of the sidewall portion 24 to facilitate clamping in the mold assembly. As can be seen, the center wall portion 22 is of greatest thickness at the center and both surfaces converge slightly towards the periphery in order to ensure freedom from air entrapment and both proper and delayed flow of the plastic material between the opposed plungers, as has been explained in detail hereinbefore. Generally, a difference in thickness of about 5 to 20 percent, and preferably about 10 to 13 percent, is employed. The side wall portion 24 tapers outwardly from the center wall portion 22 and the surfaces thereof converge slightly to the wall section 28 to facilitate the forming operation and ensure adequate volume of material for wall thickness due to the reduction in diameter, a difference in width of about 5 to 20 percent, and preferably about 10 to 13 percent being generally suitable depending upon the angle of inclination. The flange 26 and immediately adjacent portion of the wall section 28 which are received within the clamping portion of the mold assembly are preferably of slightly larger dimension than the clamping portion so as to produce some pressure flow of the synthetic plastic material upon clamping and thereby some orientation of the molecules of the material therein.

Referring now in detail to the operation of the embodiment of the apparatus and method shown in FIGURES 6 through 13, and with particular reference to the diagrammatic illustration of the major portion of the apparatus of FIGURE 6, the split mold members 30, 32 defining the generally cylindrical mold cavity 34 are mounted for reciprocal movement into the operative position shown in FIGURE 6 on the upper surface of the bed 36 of the apparatus upon action of the clamps 38, 40 and into inoperative position spaced from each other to permit loading and unloading. Platforms 42, 44 are joined for simultaneous, parallel movement relative to the bed 36 by four tie rods 46 at the side margins thereof which extend slidably through apertures 48 in the bed 36. The lower platform 42 and thereby the upper platform 44 are mounted for reciprocal vertical movement on a precision jackscrew assembly generally designated by the numeral 50 and including a jackscrew 52, gear box 54, clutch and brake assembly 56 and reversible drive motor 58.

Figure 12:
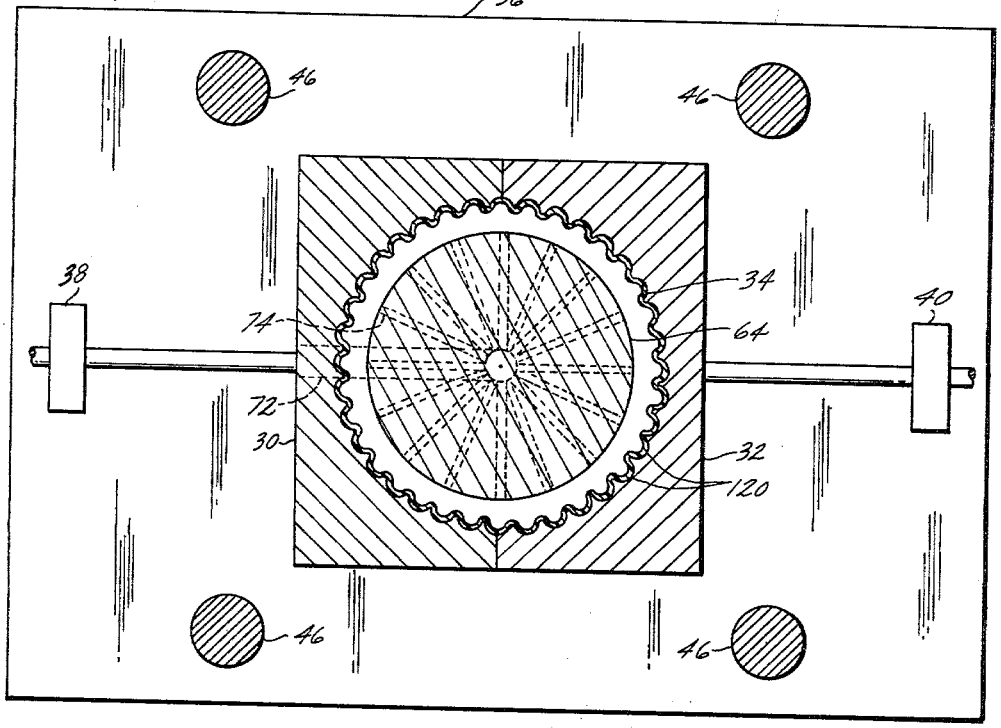
FIGURE 12 is a sectional view along the line 12—12 of FIGURE 10.

Mounted on the upper surface of the lower platform 42 is the lower plunger assembly generally designated by the numeral 60 and having a base portion 62 and an upstanding, generally cylindrical body portion 64 of lesser width than the base portion 62 so that the base portion 62 provides a radially extending shoulder thereabout. The plunger body portion 64 extends upwardly through a circular aperture 66 in the bed 36 of larger diameter than the body portion 64 to provide radial spacing therebetween. Through a pressure fitting 70 in the base portion 62, air or other fluid under high pressure is admitted to the main conduit 72 which extends to the center of the plunger assembly and thence upwardly into the body portion 64. A multiplicity of outlet ducts 74, which are best seen in FIGURE 12, extend radially therefrom and open at the side of the body portion 64 generally in alignment with the walls of the aperture 66 in the bed 36. As seen in FIGURE 6, air is admitted to the fitting 70 through the pressure line 76 from the electrically operated valve 78 which releases air under high pressure from the surge tank 80 wherein it is compressed by the high pressure pump 82. The surge tank 80 preferably is cooled to prevent the compressed air from raising the temperature of the synthetic plastic to the molten temperature when it comes into contact therewith and also to assist in cooling and setting the preform after it has been finally expanded. To provide a tight seal upon movement into contact of the shoulder provided by the base portion 62 of the lower plunger assembly 60 against the lower face of the bed 36, an O-ring or other suitable sealing element 84 seats in cooperating grooves 86, 88 in the base portion 62 and bed 36 respectively.

The upper plunger 92 has its upper end mounted for reciprocation within the hydraulic cylinder 94 which is supported upon the upper platform 44 and has an inner or lower face 96 which is generally planar with an arcuate recess 97 extending about the edge of its periphery. Hydraulic fluid is admitted to the cylinder 94 through the fittings 98, 100 and moves the plunger vertically relative to the lower plunger assembly 60 by action upon the piston flange 102 of the plunger 92. Shoulders or stops 104 within the cylinder 94 limit the movement toward the lower plunger assembly 60 to prevent overcompression of the plastic sheet material therebetween. To move the upper plunger 92 towards the lower plunger assembly 60, fluid may be admitted through the valve 106 into the upper portion of the cylinder from either the pressure control valve 108 or the metering valve 110 which control the fluid fed under pressure from the reservoir 112 by action of the reversible pump 114 which fluid simultaneously is withdrawn from the lower portion of the cylinder by the pump 114 and returned to the reservoir 112. To move the upper plunger 92 away from the lower plunger assembly 60, hydraulic fluid is admitted to the lower portion of the cylinder from the reservoir 112 by action of the pump 114 as fluid is withdrawn from the upper portion through the valve 106 and returned to the reservoir 112.

Figure 13:
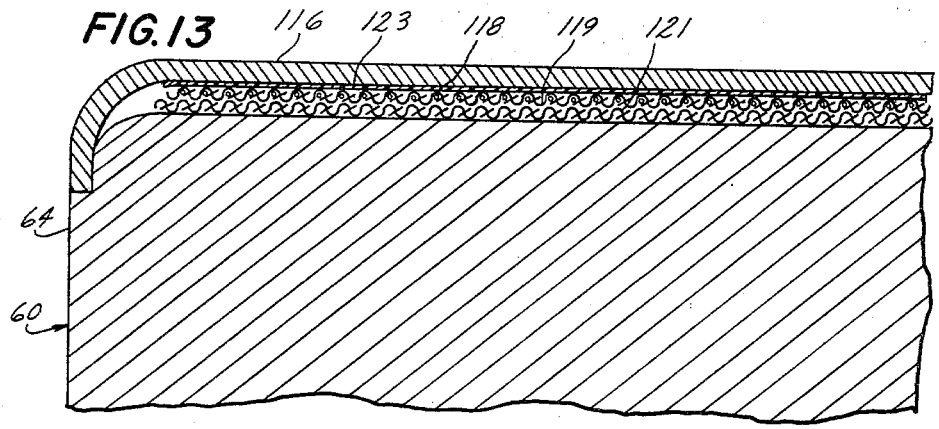
FIGURE 13 is a fragmentary sectional view to an enlarged scale of the lower plunger.

As best seen in FIGURE 13, the upper or inner face of the lower plunger assembly 60 is provided by a face plate 116 which is generally planar with a rounded periphery and flange which seats in a peripheral recess in the body 64. An impulse heating element is provided by electrical resistance wires 118 woven into cloth of polytetrafluoroethylene 119 or other similar heat-resistant material and electrically insulated from the body 64 and face plate 116 by an insulating layer of glass cloth 121 and an extremely thin insulating film 123 such as "H-Film" sold by E. I. du Pont de Nemours. Current is fed to the heating element 70 through wires (not shown) in the plunger body 64 at predetermined impulse rates to maintain the face plate 116 of the plunger assembly 60 at the orientation temperature of the synthetic plastic material of the preform 21 to prevent chilling of the preheated material. The polished steel face plate 116 may have a coating of tetrafluoroethylene or silicone to reduce friction and thereby the pressures required for flow of the synthetic plastic material. The inner face 96 of the upper plunger 92 is provided with a similar face plate and impulse heating element (not shown).

The split mold members 30, 32 are provided with water-cooling passages (not shown) to effect rapid chilling and setting of the plastic material upon final conformation of the plastic material thereinto. As best seen in FIGURES 7 and 12, the mold cavity 34 is of generally cylindrical configuration and has a multiplicity of axially or vertically extending ribs or corrugations 120 spaced thereabout. Adjacent the upper end, the cavity 34 is provided with a peripheral recess 122 of arcuate configuration extending thereabout which cooperates with the arcuate recess 97 in the face 96 of the upper plunger 92 to provide the bead 14 of the body member 2. The mold cavity 34 has a peripheral recess 124 at the lower end thereof at the bed 36 which cooperates with the upstanding annular lip 126 on the bed 36 which extends about the aperture 66 to lock the flange 26 of the preform 21 therebetween upon closing of the split mold members 30, 32. The inner face of the lip 126 flares outwardly into the mold cavity 34.

Thus, upon closure of the mold members 30, 32, the flange 26 is gripped within the recess 124 and the wall section 28 is clamped between the lip 126 and the walls of the split mold members 30, 32 which rapidly chill and set the material to minimize any tendency for this portion to be stretched. As previously stated, the flange 26 and wall section 28 preferably are slightly larger than the recess 124 and the spacing between the mold wall and lip 126 to effect some compression and flow, thereby effecting dimensional control and some molecular orientation.

Referring now to the operation of this embodiment of apparatus, FIGURE 7 shows the apparatus at the loading step in which the preform 21 which has been preheated uniformly throughout to orientation temperature in a soaking section (not shown) of the apparatus is inserted between the split mold members 30, 32 and onto the upper or inner face plate 116 of the lower plunger assembly 60. At this stage, the lower platform 42 and thereby the lower plunger assembly 60 have been withdrawn to the lower limit of travel and the upper plunger 92 has been moved upwardly within the hydraulic cylinder 94. Current is supplied to the heating element 118 under the face plate 116 of the lower plunger assembly 60 to prevent premature chilling of the preform 21.

In FIGURE 8, the clamps 38 and 40 have moved the split mold members 30, 32 together and clamped the preform 21 within the recess 124 and between the wall of the cavity 34 therein and the annular lip 126. A control circuit (not shown) opens the valve 106 to the flow of hydraulic fluid through the pressure control valve 108 until the lower or inner face 96 of the upper plunger 92 descends into contact with the center of the preform 21, at which point the resistance of the plastic material to deformation produces a variation in pressure within the conduit and closes the pressure-sensitive valve 108. Impulses are simultaneously sent to the heating element (not shown) on the plunger face 96 to prevent cooling of the plastic material. In this initial position, the thicker center of the center wall portion 22 is firmly retained between the plunger faces 96, 116.

In FIGURE 9, the assembly is shown during the pressure-forming operation. The motor 58 has commenced to elevate the jackscrew 52 and thereby the upper and lower platforms 42, 44 with the lower plunger assembly 60 and upper plunger 92, thus causing the center wall portion 22 of the preform 21 to be displaced inwardly or upwardly of the mold cavity 34 relative to its clamped periphery. Simultaneously, the metering valve 110 is activated to meter into the upper portion of cylinder 94 hydraulic fluid at a controlled and predetermined rate to effect movement of the upper plunger face 96 towards the lower plunger assembly face 116. The rate of feed through the metering valve 110 is controlled precisely to obtain continuing and uniform compression of the plastic material in the center wall portion 22 of the preform 21 during the full period of inward or parallel displacement thereof, thus initially causing compression and lateral flow of the thicker or crowned center and then the remainder of the center wall portion 22. In this manner, entrapment of air or other gases is avoided and initial stretching of the tapered side wall portion 24 of the preform occurs prior to flow of the plastic material of the center wall portion 22 about the periphery of the plunger face plate 116 to provide the synthetic plastic material needed for uniformity of thickness in the continuation of the side wall being formed by the inward displacement of the center wall portion 22.

As seen in the drawings, the lower plunger assembly body portion 64 is of lesser diameter than the mold cavity 34 so that the side wall portion of the displacing preform tapers inwardly and is spaced from the walls of the split mold members 30, 32 to prevent premature chilling. Heat is generated during the compression of the center wall portion 22 and the impulses to the plunger face heating elements are adjusted to compensate therefor and prevent the plastic material from reaching the molten temperature with the metal of the lower plunger assembly 60 and the upper plunger 92 acting as a heat sink.

In FIGURE 10 and the transverse section FIGURE 12, the jackscrew 52 has reached the upper limit of travel and the center wall portion 22 of the preform 21 has been fully displaced inwardly. During its full period of travel, the metering valve 110 has caused the upper plunger face 96 to move towards the lower plunger assembly face 116 to the desired spacing substantially equal to the desired thickness of the bottom wall portion 6 of the container body member 2, the stops 104 in the cylinder 94 acting to ensure positive control of this dimension. The displaced preform prior to final conformation is shown in phantom line with a side wall portion tapering inwardly to the edge of the lower plunger assembly face 116.

After the jackscrew 52 and the upper plunger 92 have reached this limit of their travel, air or other fluid under high pressure is introduced from the surge tank 80 through the pressure fitting 70 into the main conduit 72 and ducts 74 in the lower plunger assembly 60. As the air escapes from the ducts 74, it impinges on the wall of the aperture 66 in the bed 36 and is deflected upwardly into the interior of the displaced preform wherein it expands the walls of the preform into conformity with the surface of the mold cavity 34 and upper plunger face 96 to provide the generally cylindrical side wall portion 8 and bottom wall portion 6 with the intermediate bead 14, as is shown in solid line. The impingement of the high-pressure jets of air issuing from the ducts 74 upon the surface of the bed 36 defining the aperture 66 permits peripheral equalization of pressure about the plunger body portion 64 and minimizes the likelihood of rupturing the preform. The high-pressure air which has been precooled cooperates with the chilled split mold members 30, 32 to cool the side wall portion 8 of the now fully formed container body member 2.

At this point, the control circuit (not shown) reverses the drive motor 58 to lower the jackscrew 52 and thereby the lower plunger assembly face 116 a slight distance from the bottom wall portion 6 as the pump 114 and valve 106 move the upper plunger face 96 upwardly a compensating distance (not shown). The air then enters the space between the plunger assembly face plate 116 and the inner surface of the bottom wall portion 6 to assist in the cooling and setting thereof. The body of the plungers 60, 92 is desirably cooled so that the metal thereof extracts heat from the plastic material upon termination of the impulses to the heating elements at the faces thereof.

Figure 11:
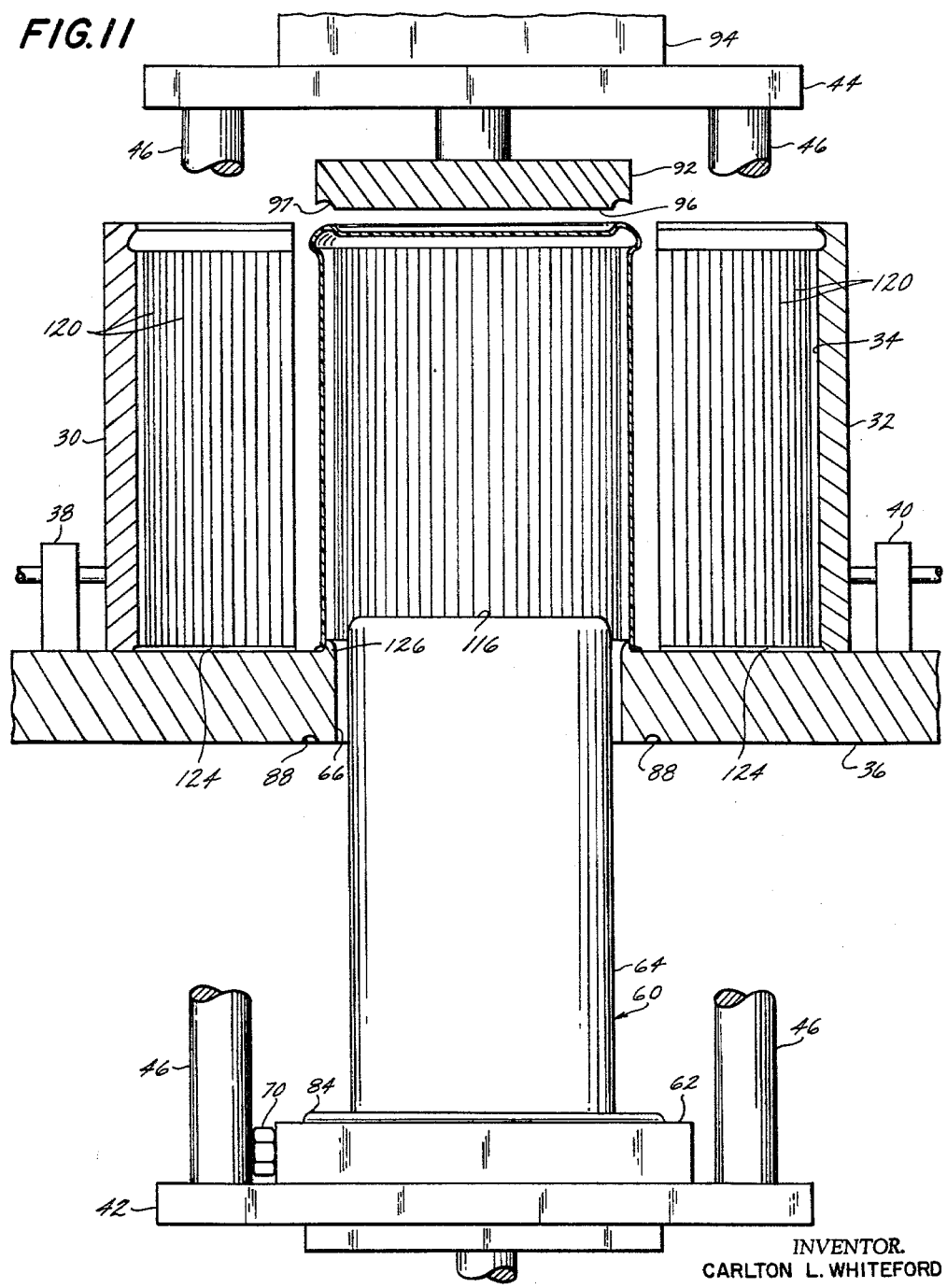
FIGURE 11 is a similar section view during the final cooling step of the cycle prior to removal of the container body from the mold assembly.

As shown in FIGURE 11, the plunger-mold assembly is then moved into unloading and loading position after the container body element 2 has cooled sufficiently and set and the high-pressure air has been bled from the interior of the container through the valve 78 to the atmosphere. The jackscrew 52 and thereby the lower plunger assembly 60 are lowered to their initial position by the motor 58, the piston flange 102 and thereby the upper plunger 92 are raised to their initial position by action of the pump 114 and valve 106, and the split mold members 30, 32 are moved apart by the clamps 38, 40. Fingers or other mechanical discharge means (not shown) or the operator then remove the former container body element and insert another preheated preform for repetition of the cycle.

Figure 14:
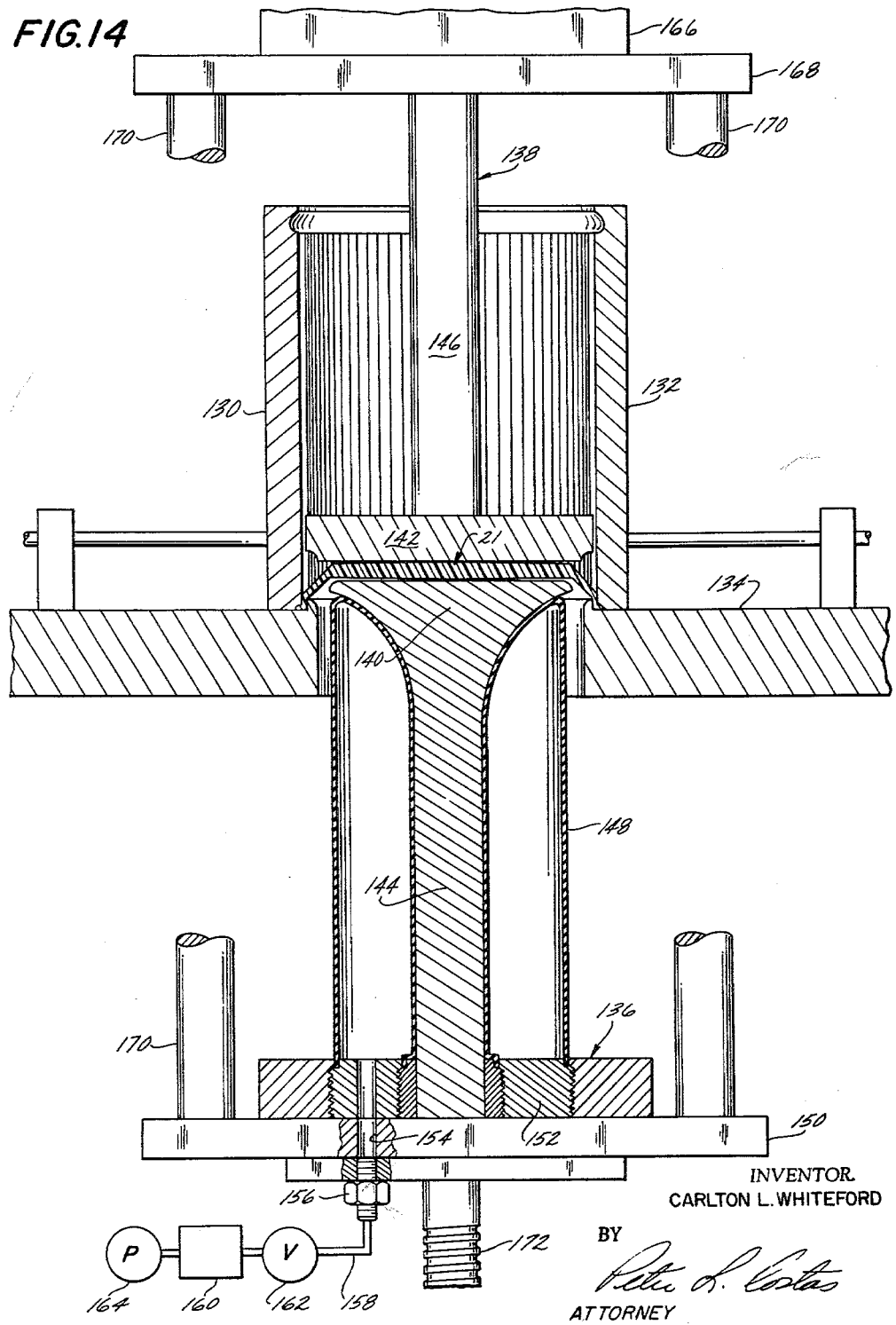
FIGURE 14 is a fragmentary sectional view diagrammatically illustrating another embodiment of apparatus for performing the method of the present invention at the commencement of the pressure-forming cycle.
Figure 15:
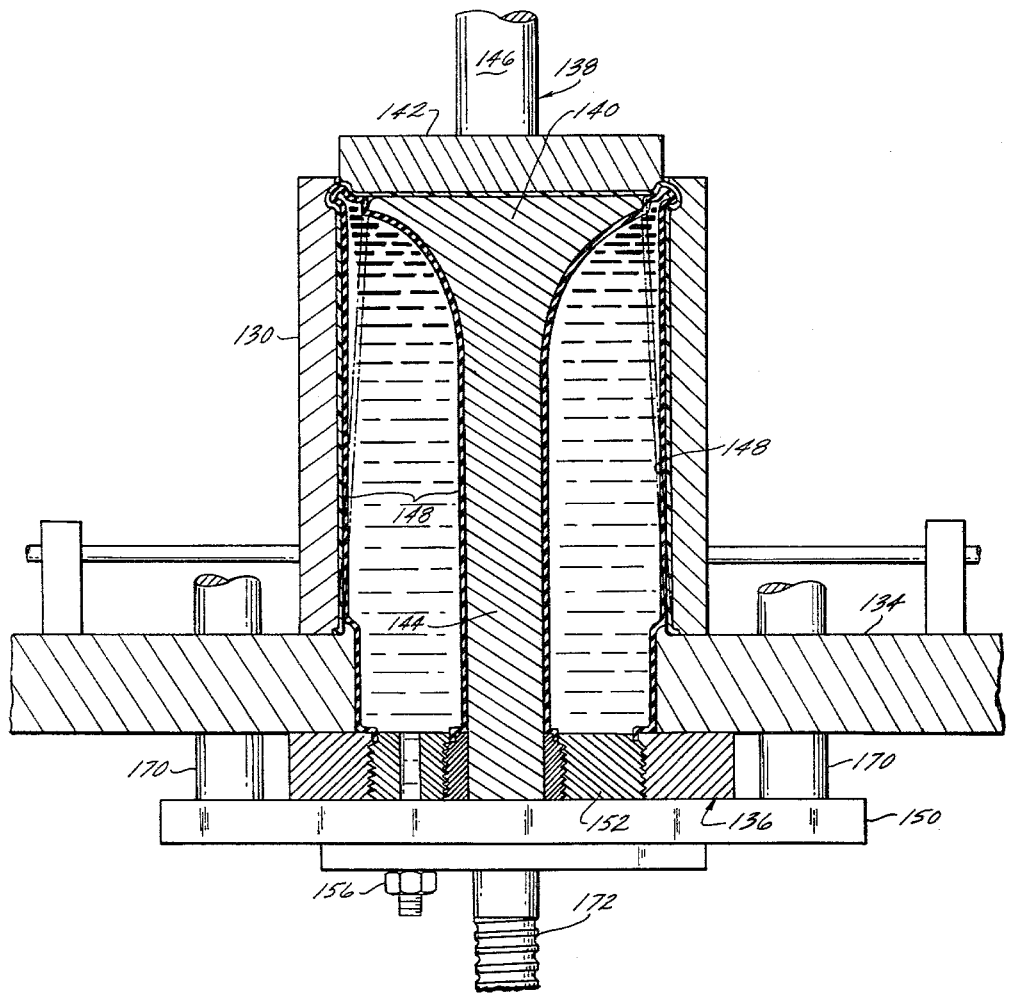
FIGURE 15 is a similar view of the embodiment of FIGURE 14 at the end of inward displacement of the center portion of the preform but prior to final deformation.

Referring now to the embodiment of FIGURES 14 and 15, the preform 21 is similarly clamped by the split mold members 130, 132 on the bed 134. The plungers generally designated by the numerals 136, 138 have opposed head portions 140, 142 of greater cross section than the supporting stem 144, 146. A generally annular bag or bladder 148 of expandable, relatively heat-resistant synthetic plastic sheet material such as polyurethane is sealed and secured to the lower platform 150 by the sealing ring 152 and in unexpanded position generally seats within the annular recess defined by the head portion 140 and platform 150. A duct 154 extends to the interior of the bladder 148 from the pressure fitting 156 which in turn is coupled to a conduit 158 extending from the surge tank 160 through the valve 162 to admit oil or other fluid under pressure of the pump 164. The upper plunger 138 is similarly supported for movement relative to the lower plunger 136 in the hydraulic cylinder 166 which in turn is carried by the upper platform 168 connected to the lower platform 150 by the tie rods 170.

In this embodiment, the bladder 148 is shown in its usual or unexpanded position in FIGURE 14. As the jackscrew 172 moves the plungers 136, 138 upwardly and displaces the center portion of the preform, the side wall portion similarly tapers inwardly until the position shown in phantom line in FIGURE 15 is reached. At this time, the valve 162 admits additional fluid under pressure from the surge tank 160 to the interior of the bladder 148 to cause it to expand outwardly and force the plastic material of the preform into conformity with the walls of the mold assembly as shown in FIGURE 15. The plungers 136, 138 are also desirably provided with impulse heating elements on their faces (not shown) and cooling means to extract heat from the plastic material after the article has been formed. After a cooling period of several seconds, the valve 162 is opened to bleed the excess fluid from the synthetic rubber bladder 148 and allow it to return to its normal shape, after which the upper plunger 138 and lower plunger 136 are moved to their initial position to permit unloading of the formed article and loading of another preform.

Referring now to the embodiment of FIGURES 16 and 17, the apparatus again employs a pair of split mold members 174, 176 on the bed 178 and defining a mold cavity 179 within which the preform 21 is received. The upper and lower plungers generally designated by the numerals 180, 182 have opposed head portions 184, 186 and stem portions 188, 190 with precision-threaded sections. The lower plunger 182 extends through a lower platform 192 and upwardly through a cylinder 194 supported between the platform 192 and bed 178 coaxial with the split mold members 174, 176 in their closed position. Annular seals 196 between the plunger 182 and platform 192 provide a pressure-tight seal between the lower portion of the cylinder 194 which has a pressure fitting 198 opening into the interior of the cylinder.

Slidably mounted on the stem portion 190 within the cylinder 194 is an annular piston member 200 and annular seals 202, 204 provide a pressure-tight seal between the piston member 200 and the stem portion 190 and wall of the cylinder 194. The piston member 200 is limited in its movement downwardly on the lower plunger 182 by the stop 206 thereon and operates against a pressure-deformable member 208 seated upon the stem portion 190 between the piston member 200 and head portion 186 under pressure of hydraulic fluid from the surge tank 210 and pump 212 admitted through the valve 214. The deformable member is fabricated of a durable, relatively non-compressible but resiliently deformable material such as polyurethane, synthetic rubber, silicone rubber, etc.

Both the deformable member 208 and plunger head portion 186 are of lesser diameter than the mold cavity 179 and the bore of the cylinder 194. The upper and lower plungers 180, 182 may be moved together away from the bed 178 and relative to each other by the reversible motor 216 operated through drive connections to the electrically controlled clutch and brake assemblies 218, 220 operating the drive gear assemblies 222, 224. The drive gear assembly 222 is constructed to move the plunger 180 upwardly at a precalculated slower rate than the rate of movement of the lower plunger 182 so as to compress at a steady rate the center portion of the preform 21 therebetween as it is displaced inwardly of the mold cavity 179 between the faces of the plungers 180, 182, thus producing a precalculated steady lateral expression of the plastic material thereof.

In FIGURE 16, the apparatus is shown prior to displacement of the center portion of the preform 21. After loading, the motor 216 and clutch assembly 218 have been actuated to move the upper plunger 180 from an elevated position into contact with the upper surface of the preform 21. Motor 216 is then reversed and clutch assemblies 218, 220 are actuated to deliver drive power to the gear assemblies 222, 224 and thus move the plungers 180, 182 upwardly or inwardly of the mold cavity to displace the center of the preform 21. The differential in rate of movement produced by the variation in the gear assemblies 222, 224 produces the desired compression and lateral flow of plastic material in the center portion of the preform 21 as it is being displaced. As the plunger 182 moves upwardly, the piston member 200 and pressure-deformable member 208 move therewith.

In FIGURE 17, the preform after full displacement of the center portion but before final conformation is shown in phantom line. After the plungers 180, 182 have reached the upper limit of travel, the valve 214 admits fluid under high pressure from the surge tank 210 to drive the piston member 200 upwardly against the adjacent end of the pressure-deformable member 208 and to expand the material of the member 208 outwardly against the preform to force it into conformity with the walls of the mold cavity 179 as shown in solid line. The plungers 180, 182 also are desirably provided with impulse heating elements on their faces and cooling means (not shown). After cooling of the conformed article, the valve 214 is opened to return the hydraulic fluid to the surge tank 210, the motor 216 and clutch assembly 220 are actuated to lower the plunger 182 and then the split mold members 174, 176 are opened to permit extraction of the formed article.

Figure 18:
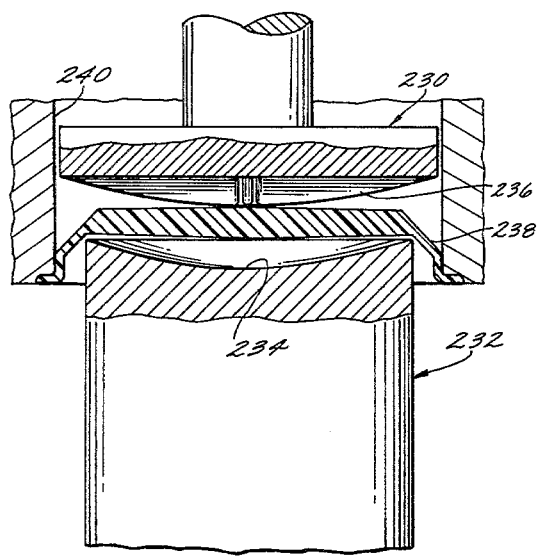
FIGURE 18 is a fragmentary elevational view in partial section of another embodiment of cooperating plungers.
Figure 19:
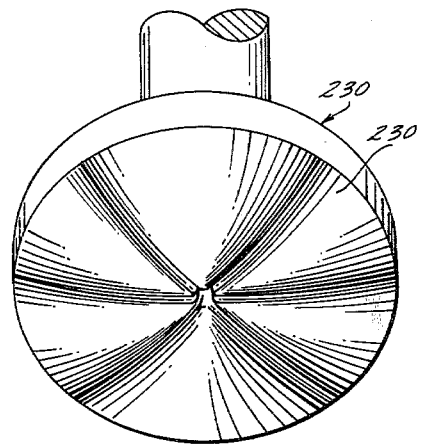
FIGURE 19 is a perspective bottom view of the face of the upper plunger of FIGURE 18.
Figure 20:
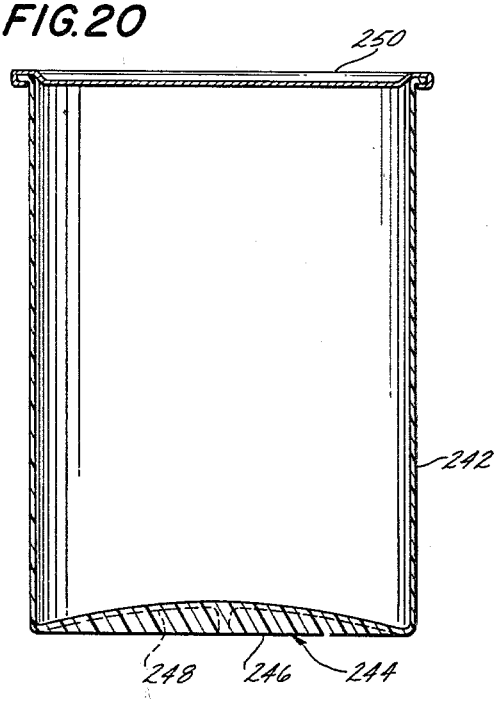
FIGURE 20 is a side elevational sectional view of a container having a body portion produced by the plungers of FIGURE 18.
Figure 21:
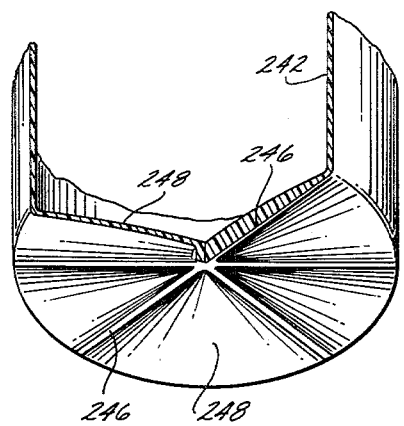
FIGURE 21 is a fragmentary bottom perspective view of the container of FIGURE 20 in section to reveal internal configuration.

Turning now to FIGURES 18 and 19, therein is illustrated a pair of cooperating plungers generally designated by the numerals 230, 232 used for producing a reinforced, internal pressure-resistant container for the liquids under pressure such as that shown in FIGURES 20 and 21. More particularly, the lower plunger 232 has a convex face 234 and the upper plunger 230 has a plurality of diametrical spoke-like recesses 236 therein. The preform 238 is crowned at its center to achieve initial compression and proper flow characteristics. When the material of the center portion of the preform 238 is compressed between the plungers 230, 232, the plastic material thereof is caused to flow both radially and chordally to fill the spoke-like recesses 236 and thence about the side of the plunger 232 to provide the material for the side wall portion being formed in the displacement of the center portion of the preform inwardly of the mold cavity 240.

A reinforced, internal pressure-reinforced container produced thereby is illustrated in FIGURES 20 and 21 as having a side wall portion 242 of generally uniform thickness and a bottom wall portion generally designated by the numeral 244 with a generally concave inner surface produced by the convex face of the plunger 234. The recesses 236 in the plunger 230 produce spoke-like rib portions 246 with generally flat bottom surfaces aligned with the bottom of the container and arched web portions 248 therebetween. A metal cap 250 provides the top closure therefor. In this manner, the reinforced concave bottom wall resists internal pressure which would tend to deform a planar bottom wall of uniform thickness. Substantial multiaxial orientation of the molecules occurs in the bottom wall by reason of the compressive flow radially and chordally to provide the thicker spoke-like rib portions 246 and arched web portions 248 therebetween and the material radially flowing about the plunger 232 is initially radially oriented and then vertically and peripherally stretched.

Turning now to FIGURES 22 and 23, therein illustrated is a dispenser container having a body member generally designated by the numeral 252 and a closure member generally designated by the numeral 254. The body member 252 is of generally oblate spheroidal cross section with convex ends and relatively flat side walls therebetween. The peripheral corrugations of the sidewall portion 256 increase the hoop strength thereof and terminate at the rim portion 258 which is at the upper end thereof. A peripheral bead or flange 260 extends radially outwardly of the rim portion 258 adjacent its upper end. The side wall portion 256 is substantially equal in thickness to the substantially planar bottom wall portion 262 but the rim portion 258 is of greater thickness since this portion is not highly oriented as is the remainder of the body member 252.

The closure member 254 has a top wall portion 264 which extends across the top of the body member 252 and a sidewall portion 266 which closely overlies the rim portion 258 with outwardly flaring peripheral flange section 268 thereon which overlies the upper surface of the uppermost corrugation of the sidewall portion 256. A peripheral bead 270 at the upper end of the closure sidewall portion 266 provides a recess in which the peripheral bead 260 of the body rim portion 258 engages to interlock the two members 252, 254. In addition to this mechanical lock which may be provided by snap-fitting the closure member 254 over the rim portion 258 or by forming it thereabout, adhesive or solvent sealing of the opposed surfaces may be used to increase the engagement thereof. The top wall portion 264 is formed with a generally curvilinear recess 272 therein adjacent one end inclined inwardly therefrom and generally planar inner wall element 276 which is inclined upwardly at the inner end thereof toward the opposite end of the top wall portion and inwardly of the recess 272 between the lowermost portion of said recess and the plane of the major wall portion in the initial, as-fabricated position shown in full line in FIGURE 23. The top wall portion 264 is weakened or cut-scored transversely along the length of the upper edge of the wall element and along two spaced parallel lines extending generally normal therefrom inwardly towards the other end of the top wall portion, all as indicated by the dotted lines 276. In this manner, the user may insert a finger into the recess 272 to rupture or tear the top wall portion along the perforations 276, thus providing a readily accessible hinged closure element since the wall element 274 moves past center into the position shown in phantom line in FIGURE 23 and the imperforate top wall between the ends of the parallel score lines acts as a hinge.

The preform for making the body element 252 is shown in FIGURE 24 as having a relatively thick center or bottom wall portion 278 which has both surfaces converged from the thicker center thereof and an outwardly flaring sidewall portion 280 which has a peripheral bead or flange 282 extending radially outwardly adjacent the upper edge thereof. In forming this preform, the bead 282 and upper portion of the sidewall portion 280 are gripped between the split molds of the forming apparatus (not shown), and the opposed plungers of the apparatus will compress the center wall portion 278 as it is being displaced inwardly of the mold cavity which is provided with a plurality of spaced peripheral recesses. After the final displacement, the preform is expanded into conformity with the mold cavity to produce full orientation and the peripheral ribs or corrugations in the sidewall portion 256. Thus, a highly multiaxially oriented sidewall portion 256 and bottom wall portion 262 will be produced and the split mold members and bed lip may be dimensioned to produce some compression and flow of the rim portion 258 to effect some molecular orientation therein which, together with the greater thickness thereof, will provide high strength and relative rigidity therein.

As will be readily appreciated, the closure member 254 preferably is thermoformed in accordance with conventional practice, although it may be injection molded or formed in accordance with the method of multiaxial orientation of the invention, if so desired.

Turning now to FIGURES 25-27, therein illustrated is an integrally formed, hinged closure container suitable for cigarettes and the like which is formed from an injection-molded preform illustrated in FIGURES 28 and 29. The container has a generally planar bottom wall 284, generally planar end walls 286, 288 and generally planar side walls 290, 292 with closure elements 294, 296 hingedly connected to the upper edges thereof. As best seen in FIGURES 26 and 27, the end walls 286, 288 extend to substantially the full height of the container and each has a pair of relatively closely spaced vertically extending spacing ribs 298 on its inner surface which taper inwardly to the major surface of the end walls 286, 288. Adjacent their arcuate upper ends, each of the end walls 286, 288 has a pair of locking indents 300 spaced to opposite sides of the ribs 298. The side walls 290, 292 are of lesser height than the end walls 286, 288 with the adjacent or side wall portions 302, 304 of the closure elements 294, 296 cooperating in dimension with the side walls 290, 292 to extend slightly above the end walls 286, 288 so that the outer or top wall portions 306, 308 thereof overlie the end walls 286, 288 as seen in FIGURE 25. The connecting or web portion between the side walls 290, 292 and closure elements 294, 296 has a groove or recess 310 extending thereacross in the outer surface thereof to provide a reduced web section acting as a hinge line.

The inside surfaces of the closure elements have a plurality of spaced reinforcing ribs 312 extending through both the side wall portions 302, 304 and the top wall portions 306, 308 thereof to increase their rigidity. The closure elements 294, 296 also have end wall portions 314, 316 to which overlie the upper margins of the end walls 286, 288 to provide dust seals and which have locking projections 318 on the inner surface thereof that snap into the indents 300 of the end walls 286, 288 to hold the closure elements in closed position. As best seen in FIGURE 25, the closure elements are dimensioned so that their inner ends are in overlying relationship to provide a good seal for the interior of the container.

Since the closure elements 294, 296 are initially molded in the open position shown in FIGURE 26, they spring open to this position upon disengagement of the locking projections 318 from the indents 300, which disengagement is simply effected by pressing inwardly upon the upper ends of the end walls 286, 288. To achieve most optimum hinge properties, the container is formed of polypropylene or a polyallomer of polypropylene-polyethylene.

The preform for the container of FIGURES 25-27 is shown in FIGURES 28 and 29 as being an injection-molded structure with a relatively thick bottom or center wall 320 which is thicker at its center, side walls 322, 324 which flare outwardly from the center wall 320 to the closure elements 294a, 296a and end walls generally designated by the numerals 326, 328 which have bottom portions 330, 332 flaring outwardly from the center wall 320 and upper portions 334, 336 extending generally vertically. The closure elements 294a, 296a have the reinforcing ribs 312a and locking projections 318a formed thereon, and the end walls 326, 328 have indents 300a and vertical ribs 298a which originate adjacent the upper end of the upper portions 334, 336 and blend into the inner surface of the inwardly inclining bottom portions 330, 332.

In forming the container, the preform is clamped in the apparatus mold cavity (not shown) about the closure elements 294a, 296a and the upper portions 334, 336. Preferably this portion of the preform is so dimensioned that the mold cavity and clamping lip will effect some compression and flow with some resultant orientation of the molecules therein. The center or bottom wall 320 is compressed between the forming plungers and the material thereof is caused to flow about the lower plunger to effect orientation and provide material for the side and end walls of the container being formed by the inward displacement of the center wall 320. Upon final conformation by the auxiliary or internal pressure means, the side and end walls are expanded into substantially vertical planes with a high degree of multiaxial molecular orientation throughout the unclamped portion. Although the closure elements 294, 296 and the upper portions of the end walls 286, 288 provided by the portions 334, 336 of the preform are not substantially oriented, the ribs 298, 312 and the overlapping portions provide relative rigidity and satisfactory strength.

In each of the several embodiments illustrated and described hereinbefore, it can be seen that the opposed plungers effect substantial radial or multiaxial orientation of the material in the center wall portion of the preform by compression therebetween and flow of the oriented material into the sidewall portion being formed by the displacement of the center portion. The inward displacement of the center wall portion produces vertical orientation in at least the initial sidewall portion of the preform and the final conformation produced by the internal pressure means results in peripheral orientation of the sidewall portion, thus producing a high degree of multiaxial orientation of the molecules of synthetic plastic material throughout the article except in the flange and adjacent sidewall portion wherein the molecules can be oriented to a considerably lesser degree and which are therefore referred to as "relatively unoriented."

The term "substantially multiaxially oriented" as used herein refers to substantial orientation of the molecules of the synthetic plastic material generally in the major planes of the wall portion in which they are located. This orientation may be radial in the case of the bottom wall portion; vertical, peripheral and generally diagonal in the case of the sidewall portion throughout the lower portion thereof commencing at the bottom wall portion; and primarily vertical and peripheral in the remainder or upper portion of the substantially oriented sidewall portion provided by the initial sidewall portion of the preform. In the instance of thickened ribs in a wall portion, dimensioning of the preform may produce some orientation of the molecules generally normal to the major plane of the wall portion through flow under pressure into the recesses of the defining recess in the forming member.

The wall thicknesses can be relatively easily predetermined and substantially uniform by control of the volume of material in the various sections of the preform and control of the relative rate of compression of the center wall portion and of the inward displacement thereof. Additionally, a substantially uniform and controlled surface finish can be obtained on the inside of the bottom wall by the plunger surface. As in the case of the preform of FIGURES 28 and 29, mechanical elements of the final container may be incorporated in the preform which are substantially unaffected during the forming operation and which may also serve as the flange portion by which the preform may be clamped firmly within the mold assembly.

Various orientable thermoplastic materials may be used in the present invention such as polymers of polypropylene, polystyrene, polyethylene, polycarbonate, polyamide, polyester and copolymers thereof. Of the various resins, polypropylene has optimum properties commensurate with cost in that it provides the internal hinge effect where desired together with high strength in relatively thin section.

As a specific example of the present invention, a container of the type illustrated in FIGURES 1–4 is made from the preform of FIGURE 5 in apparatus of the type illustrated in FIGURES 7–13. The preform is injection molded of polypropylene and has a center or bottom wall about 0.163 inch at its center having both surfaces converging to the periphery where the thickness is 0.143 inch. The sidewall is 0.055 inch at the center wall and both surfaces converge to the wall section along the upper edge thereof where the thickness is 0.050 inch, the total height of the preform being 0.595 inch and the height of the wall section and flange being 0.156 inch.

The preform is preheated uniformly throughout by soaking in air to a temperature of about 290° Fahrenheit and then inserted into the mold cavity. The jackscrew motor and assembly is of 10 ton capacity and the hydraulic cylinder operating the upper plunger is of 50 ton capacity. The jackscrew is geared to displace the center portion of the preform to an overall container height of 5$^{17}/_{32}$ inches in about 2.6 seconds during which time the metering valve uniformly moves the upper plunger downwardly relative to the lower plunger to a final spacing of 0.020 inch. Air is then introduced into the interior of the stretched preform which air is at a pressure of about 900 p.s.i.g. and at a temperature of about 100° Fahrenheit which expands the displaced preform into full contact with the mold wall and upper plunger face including the recesses or corrugations thereof.

The lower plunger is lowered slightly by the jackscrew as the upper plunger is elevated a compensating distance by the cylinder to permit air to cool the inner surface of the center or bottom wall for about 3 seconds, after which the air is bled out of the interior of the container and the plungers and split molds returned to initial position to permit unloading and reloading. The resultant container body has a substantially uniform wall thickness of about 0.020 inch throughout with a high degree of multiaxial orientation of the molecules in all but the flange and wall section adjacent thereto. A preprinted band of uniaxially oriented polypropylene film of about 3 mils in thickness is adhesively secured thereabout to provide hoop strength and enhance the resistance to crushing under heavy vertical loading as occurs upon stacking of cases. A metal cover spun about the flange completes the assembly.

Thus, it can be seen that the present invention provides a novel method for forming containers and other hollow articles of synthetic plastic material wherein the molecules in the wall portions are substantially highly multiaxially oriented and wherein the wall thickness can be relatively closely controlled to achieve high strength, substantial uniformity in thickness and optimum utilization of material for most economic practice. The present invention provides a novel method for the production of preforms and oriented hollow articles affording a wide degree of design variation and permitting the incorporation of integrally formed mechanical elements such as hinged closures. Thus, the present invention enables the relatively economical and facile manufacture of highly multiaxially oriented synthetic plastic containers and other hollow articles at relatively rapid rates and with a high degree of dimensional control.

Having thus described the invention, I claim:

1. In the method of forming hollow articles of substantially multiaxially oriented synthetic plastic material, the steps comprising: molding a preform of an orientable synthetic plastic material; clamping said preform about its periphery adjacent one end of a mold cavity of the desired sidewall configuration; displacing the center portion of said preform inwardly of said mold cavity relative to the clamped periphery thereof while simultaneously applying compressive pressure thereto to effect lateral flow of the plastic material in the center portion and provide synthetic plastic material in the wall portion being formed between said clamped periphery and displacing center portion during the formation of said wall portion; and applying pressure to the interior of said preform after said displacement of the center portion to expand the preform into conformity with the wall of said mold cavity to form a hollow article, said displacement and pressure applications being conducted below the molten temperature and at orientation temperatures of said synthetic plastic material to effect molecular orientation during said displacement, lateral flow and expansion of said preform material.

2. The method in accordance with claim 1 wherein said preform is preheated substantially uniformly throughout to orientation temperatures of said synthetic plastic material before clamping about its periphery.

3. The method in accordance with claim 1 wherein said synthetic plastic material is polypropylene and said orientation temperature is about 150 to 320° Fahrenheit.

4. The method of claim 1 wherein said displacement of and compressive pressure application to the center portion of said preform is effected by moving a pair of plunger means on the opposite surfaces thereof inwardly of said mold cavity to effect the displacement and moving one of said plunger means towards the other during said first-named movement to compress the center portion.

5. The method in accordance with claim 1 wherein said preform has an integral flange extending outwardly about its periphery and said flange is clamped at said one end of said mold cavity.

6. The method in accordance with claim 1 wherein said preform has a center portion which is thicker at its center and both surfaces converge outwardly therefrom.

7. The method in accordance with claim 1 wherein said preform has a center portion, a sidewall portion extending thereabout and inclined outwardly therefrom and a flange extending outwardly of said preform adjacent the end thereof spaced from said center portion and is clamped at said flange.

8. The method of claim 7 wherein said sidewall portion of said preform is of greater thickness adjacent the center wall portion and the surfaces thereof converge towards said flange.

9. The method of claim 7 wherein said center wall portion of said preform is of greater thickness at its center and the surfaces thereof converge outwardly therefrom.

10. The method of claim 1 wherein said internal pressure application is effected by introducing a fluid under pressure to the interior of the preform to impinge upon the interior surface of said preform and expand it into conformity with said mold cavity.

11. The method of claim 1 wherein said internal pressure application is effected by resilient deformation of a relatively incompressible core member within said preform to impinge upon its surface and expand it into conformity with the mold cavity.

12. The method of claim 1 wherein said internal pressure application is effected by resilient expansion of an expansible bladder within said preform through introduction of fluid under pressure thereinto to expand said bladder and the preform into conformity with the mold cavity.

13. In the method of forming hollow articles of substantially multiaxially oriented synthetic plastic material, the steps comprising: molding a preform of an orientable synthetic plastic material having a center wall portion and a sidewall portion inclined outwardly therefrom; preheating said preform substantially uniformly throughout to the orientation temperature but below the molten temperature of said synthetic plastic material; clamping said preform about the periphery of said sidewall portion adjacent one end of a mold cavity of the desired sidewall configuration and between a pair of plunger means on opposite surfaces of said center wall portion; moving said pair of plunger means inwardly of said mold cavity to displace the center wall portion of said preform inwardly of said mold cavity relative to the clamped periphery thereof while simultaneously moving said plunger means towards each other to compress the center wall portion and effect lateral flow of the plastic material in the center portion and provide synthetic plastic material in the sidewall portion being formed between said clamped periphery and displacing center wall portion during the formation of said sidewall portion; and applying pressure to the interior of said preform after said displacement of the center wall portion to expand the preform into conformity with the wall of said mold cavity to form a hollow article, said displacement and pressure applications being conducted below the molten temperture and at orientation temperatures of said synthetic plastic material to effect molecular orientation during said displacement, lateral flow and expansion of said preform material.

14. The method in accordance with claim 13 wherein said center wall portion is thicker at the center and the surfaces thereof converge outwardly therefrom and said sidewall portion is of greatest thickness adjacent said center wall portion and the surfaces thereof converge outwardly therefrom.

15. The method in accordance with claim 13 wherein said internal pressure application is effected by introducing a fluid under pressure to the interior of said preform to impinge upon the interior surface thereof and expand it into conformity with said mold cavity.

References Cited by the Examiner
UNITED STATES PATENTS

| | | | |
|---|---|---|---|
| 1,760,288 | 5/30 | Stevens | 18—19 |
| 1,856,319 | 5/32 | Cooper | 18—19 |
| 2,092,001 | 9/37 | McDougal | 264—313 |
| 2,385,486 | 9/45 | Bartoe et al. | 264—331 |
| 2,448,433 | 8/48 | Irons et al. | 264—88 |
| 2,685,316 | 8/54 | Krasno | 150—.5 |
| 2,727,547 | 12/55 | Moon | 150—.5 |
| 2,804,642 | 9/57 | Milne | 264—88 |
| 2,854,694 | 10/58 | Mumford | 264—94 |
| 2,878,513 | 3/59 | Slaughter | 264—292 |
| 3,032,823 | 5/62 | Sherman | 264—314 |
| 3,080,269 | 3/63 | Pollack et al. | 264—314 |
| 3,089,189 | 5/63 | Feldman et al. | 264—313 |

ALEXANDER H. BRODMERKEL, *Primary Examiner.*
FRANKLIN T. GARRETT, *Examiner.*